(12) United States Patent
Nakajima et al.

(10) Patent No.: US 7,353,578 B2
(45) Date of Patent: Apr. 8, 2008

(54) CAP TIP DETACHING APPARATUS FOR WELDING MACHINE

(75) Inventors: Toshio Nakajima, Kuwana (JP); Takeo Fukizawa, Nishikasugai-Gun (JP)

(73) Assignee: Shinkokiki Co., Ltd., Nagoya (JP)

( * ) Notice: Subject to any disclaimer, the term of this patent is extended or adjusted under 35 U.S.C. 154(b) by 150 days.

(21) Appl. No.: 11/284,390

(22) Filed: Nov. 21, 2005

(65) Prior Publication Data

US 2006/0101630 A1    May 18, 2006

Related U.S. Application Data

(63) Continuation of application No. PCT/JP2004/011688, filed on Aug. 13, 2004.

(30) Foreign Application Priority Data

Jun. 15, 2004  (JP) ............................. 2004-176469
Jun. 15, 2004  (JP) ............................. 2004-176470

(51) Int. Cl.
*B23P 19/04*   (2006.01)

(52) U.S. Cl. ......................................... 29/239; 29/238

(58) Field of Classification Search ................. 29/239, 29/238, 267, 268, 270
See application file for complete search history.

(56) References Cited

U.S. PATENT DOCUMENTS

| 5,283,936 | A | * | 2/1994 | Pickles et al. ................. 29/268 |
| 5,495,663 | A | | 3/1996 | Saito |
| 5,802,690 | A | * | 9/1998 | Bullock ........................ 29/237 |
| 6,012,361 | A | * | 1/2000 | Wooster et al. ............... 81/367 |
| 6,434,807 | B1 | * | 8/2002 | Begin ........................... 29/227 |
| 2006/0101630 | A1 | * | 5/2006 | Nakajima et al. ............. 29/267 |

FOREIGN PATENT DOCUMENTS

| DE | 84 22 113 | 12/1987 |
| JP | 07-171686 A1 | 7/1995 |
| JP | 2002-079382 A1 | 3/2002 |
| JP | 2002-239749 A1 | 8/2002 |

* cited by examiner

*Primary Examiner*—Lee D Wilson
(74) *Attorney, Agent, or Firm*—Burr & Brown

(57) ABSTRACT

A cap tip detaching apparatus for a resistance welding machine that detaches a cap tip fitted to a shank of the resistance welding machine. The apparatus includes a pawl portion including a fixed pawl and a movable pawl. The fixed pawl extends in a direction orthogonal to the shank axis so as to be brought into close contact with a lower end portion of the shank. The movable pawl, forming a pair with the fixed pawl, is provided in a leading end of a leverage type lever and is brought into close contact with an upper end portion of the cap tip. A drive portion is included for moving the pawl portion to a portion between the shank and the cap tip. A rotating mechanism, working with the drive portion, rotates the lever to disconnect the cap tip from the shank by pushing down the movable pawl.

4 Claims, 12 Drawing Sheets

CAP TIP DETACHING APPARATUS FOR WELDING MACHINE

CROSS REFERENCE TO RELATED APPLICATIONS

This application is a continuation of International Application No. PCT/JP2004/011688 having an international filing date of Aug. 13, 2004, which designated the United States, and claims the benefit of Japanese Application No. 2004-176469, filed Jun. 15, 2004 and Japanese Application No. 2004-176470, filed Jun. 15, 2004, the entireties of which are incorporated herein by reference.

FIELD OF THE INVENTION

The present invention relates to a cap tip detaching apparatus for a welding machine that can simply and securely detach a cap tip fitted to a leading end portion of a shank of the welding machine without damaging the shank.

BACKGROUND OF THE INVENTION

Conventionally, spot welding has widely been utilized as one of the methods for welding a metal member. In spot welding, a welding gun, in which a cap tip is fitted to a leading end of a shank, is often attached to a robot arm. However, if the welding gun is used for a long time, a shape of the leading end of the cap tip becomes deformed and worn, and it is hard to secure a quality weld. Accordingly, the shape of the leading end of the cap tip is maintained by automatically grinding the cap tip periodically after a fixed processing time or a fixed number of welding points, or by replacing the cap tip from the leading end of the shank with a new or ground one.

On the other hand, in recent years, because a rust proofing process using a chemical treatment agent is frequently applied to a welded material, the cap tip wears out early requiring more frequent replacement. However, stopping a production line and replacing the cap tip lowers production efficiency. Accordingly, in order to make it possible to replace the cap tip without stopping the production line, there is proposed an automatic detaching apparatus of a cap tip that is attached to a leading end of a robot arm, for example, as shown in Japanese Unexamined Patent Publication No. 2002-79382.

However, the conventional automatic detaching apparatus of the cap tip described in this publication is structured such that one fork-like lever is inserted into a gap between the cap tip and the shank, the lever is inclined in a state of being applied to the shank side, and the cap tip is detached in such a manner as to be unclenched in through an application of leverage. In this case, there is a problem that a concentrated load is applied to a corner portion of the shank and the tip with which the lever is brought into contact causing a scratch. Further, there is another problem that the lever is not inserted properly to the gap between the cap tip and the shank, and the cap tip fails to be detached.

SUMMARY OF THE INVENTION

An object of the present invention is to provide a cap tip detaching apparatus for a welding machine that solves the problems mentioned above. The apparatus can simply and securely detach a cap tip fitted to a leading end portion of a shank of a welding machine such as a resistance welding machine or the like, and the apparatus has no risk of damaging the shank at a time of detaching.

In accordance with the present invention, there is provided a cap tip detaching apparatus of a welding machine for detaching a cap tip fitted to a leading end portion of a shank of the welding machine, including:

a fixed pawl movable in an orthogonal direction with respect to an axial direction of the shank so as to be brought into close contact with a lower end portion of the shank;

a movable pawl coupled together with the fixed pawl so as to be brought into close contact with an upper end portion of the cap tip; and a rotating mechanism for rotating a lever extending to a rear side of the movable pawl, thereby pushing down the movable pawl so as to move away from the fixed pawl and disconnect the cap tip from the shank.

In accordance with a preferred embodiment, the rotating mechanism is provided with a slide truck that is freely movable in the orthogonal direction. The slide truck is provided with a cam groove for rotating the lever for pushing down the movable pawl on the basis of further movement of the slide truck in the orthogonal direction after moving the fixed pawl to a portion between the shank and the cap tip. Further, in accordance with another preferable embodiment, the rotating mechanism is provided with a wedge type slide plate. The rotating mechanism rotates the lever in such a manner as to push down the movable pawl on the basis of the further movement of the slide plate in the orthogonal direction after moving the fixed pawl to a portion between the shank and the cap tip.

The apparatus in accordance with the present invention is used, for example, by being attached to a leading end of a robot arm. The pawl portion, which is constituted by the fixed pawl and the movable pawl, moves in the orthogonal direction to the portion between the shank of the welding gun and the cap tip, brings the fixed pawl into close contact with the lower end portion of the shank, and brings the movable pawl into close contact with the upper end portion of the cap tip. Thereafter, the apparatus rotates the lever extending to the rear side of the movable pawl by the rotating mechanism so as to push down the movable pawl in such a manner as to move away from the fixed pawl and disconnect the cap tip-from the shank. At this time, since the fixed pawl is in contact with the shank and does not move, the shank is not damaged. Therefore, it is possible to simply and securely detach the cap tip. In this case, there is a possibility that the detached cap tip is damaged by the movable pawl. However, this is not a problem because the cap tip is replaced. Further, since the fixed pawl does not move and the movable pawl is only pivoted by the shaft so as to be rotated, there is an advantage that the pawl portion is not likely to be damaged.

DETAILED DESCRIPTION OF THE INVENTION

A description will be given below of a preferred embodiment in accordance with the present invention with reference to the accompanying drawings.

Figure 1:
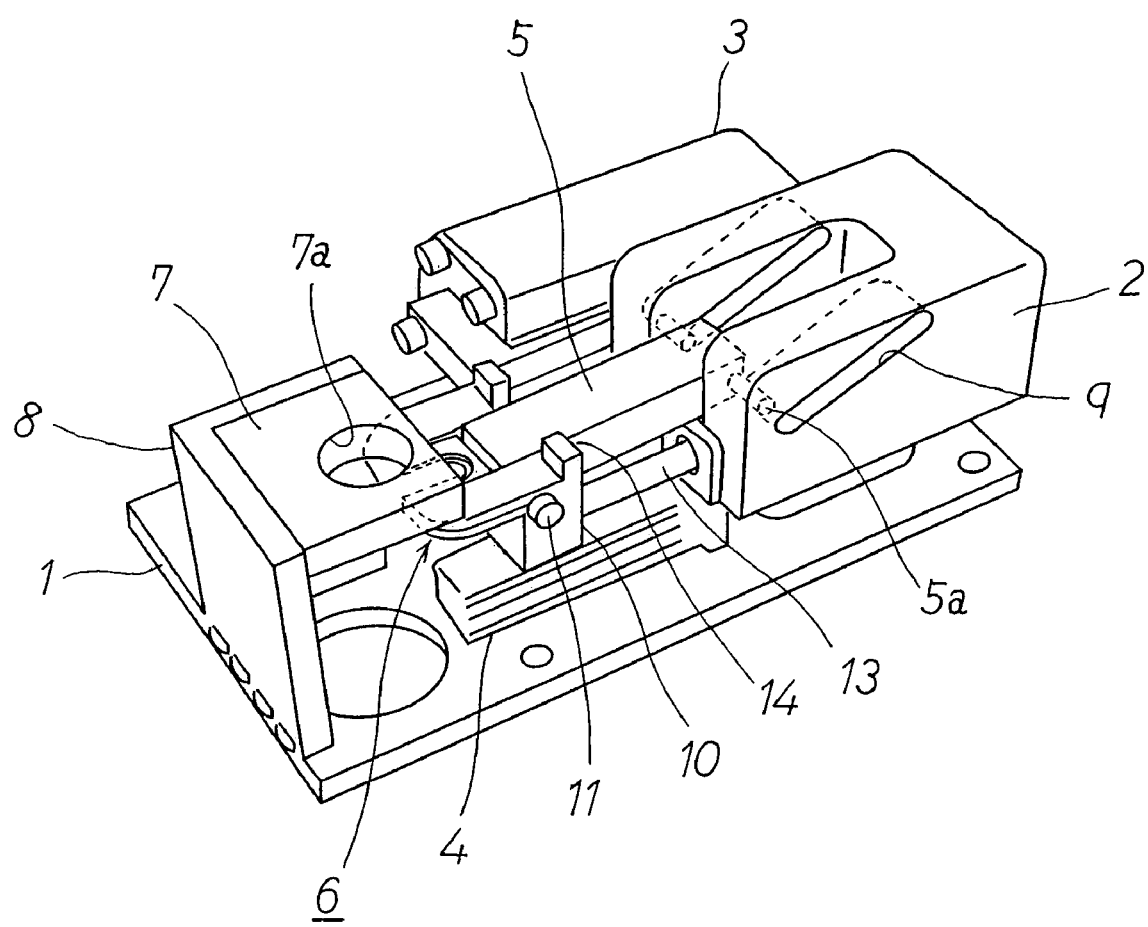
FIG. 1 is a perspective view of an entire structure showing a first embodiment in accordance with the present invention.
Figure 2:
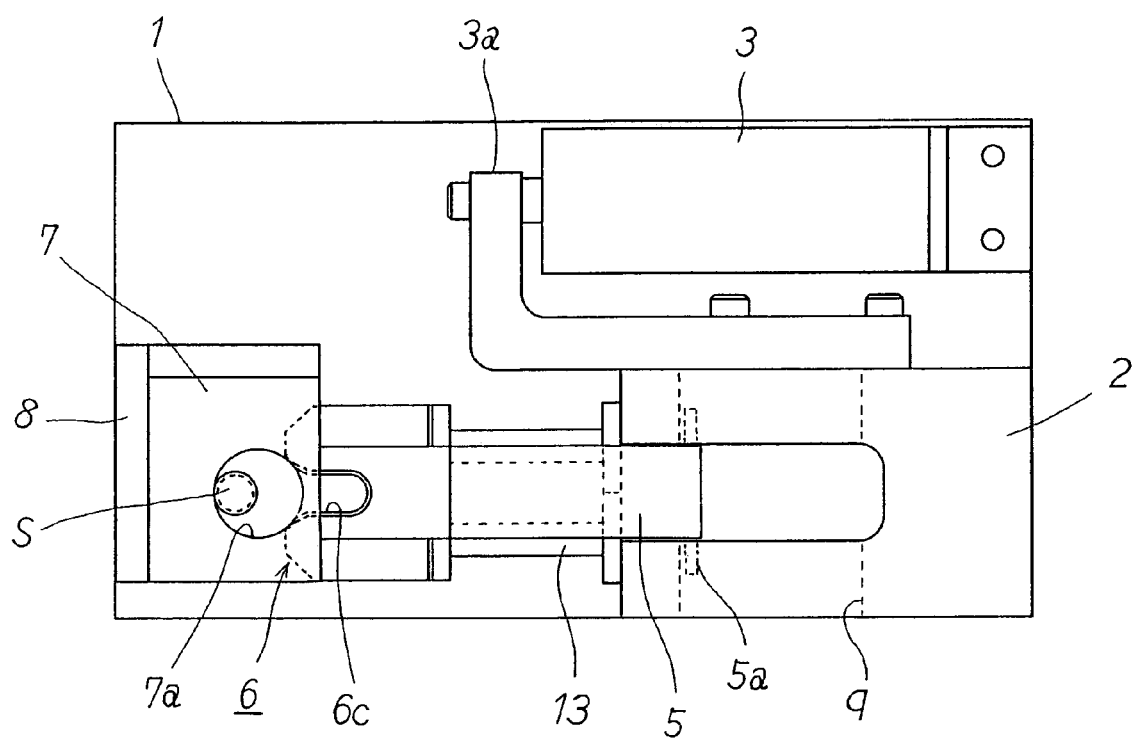
FIG. 2 is a plan view of FIG. 1.
Figure 3:
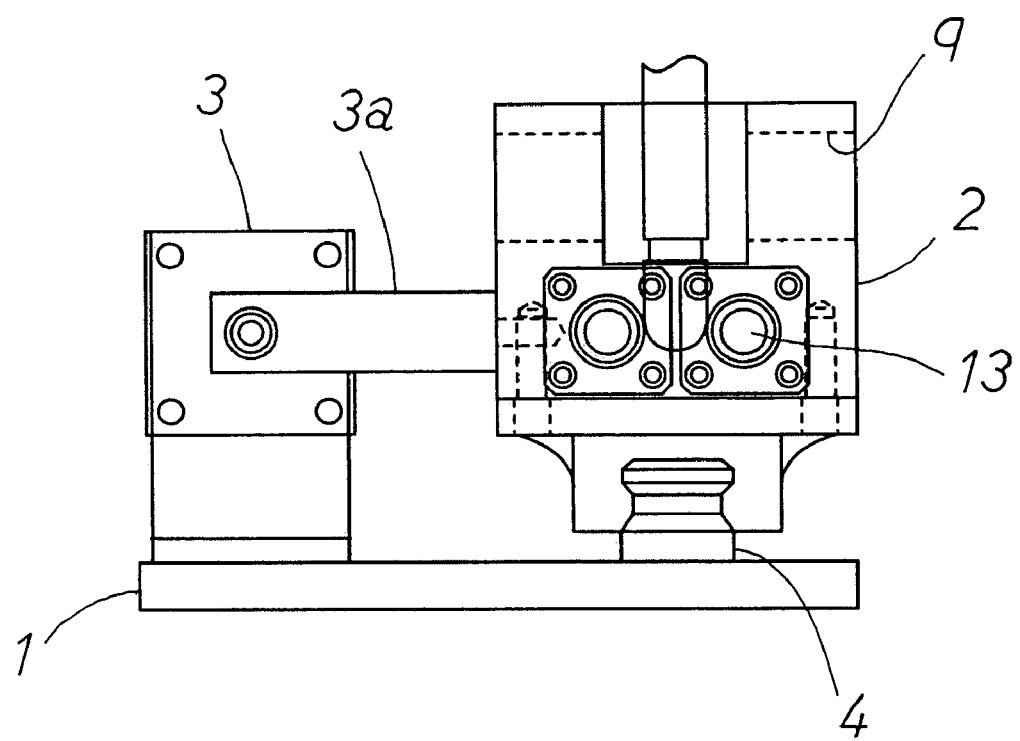
FIG. 3 is a side elevational view of FIG. 1.
Figure 4:
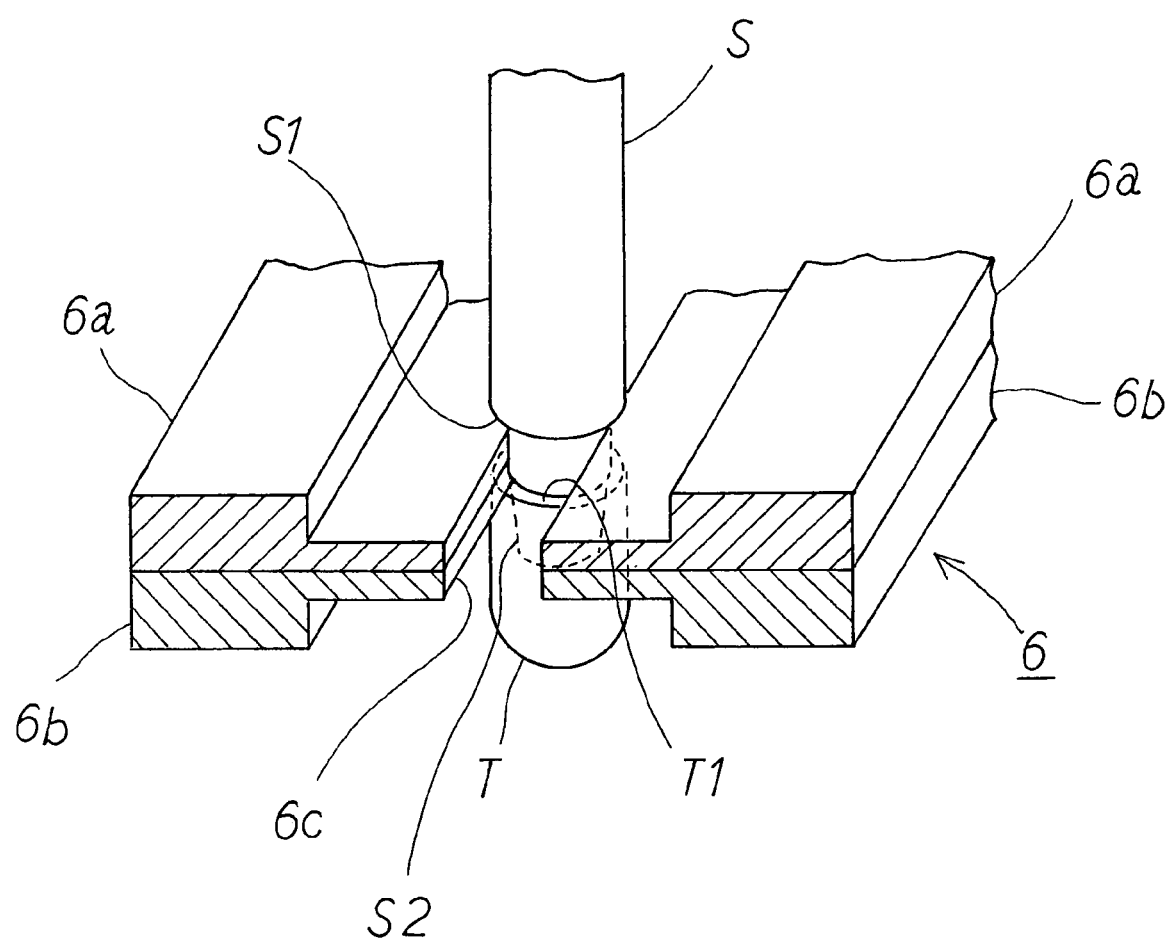
FIG. 4 is a perspective view of a pawl portion.

FIG. 1 is a perspective view of an entire structure showing a first embodiment in accordance with the present invention, FIG. 2 is a plan view of the first embodiment, FIG. 3 is a side elevational view, and FIG. 4 is a perspective view of a pawl portion. An apparatus in accordance with the embodiment is used by being attached to a leading end of a robot arm and being moved to a welding gun portion of a welding machine in which a cap tip is going to be replaced. However, since the robot arm portion is well known, it is omitted in the drawings. In this case, in the following description, it is assumed that the welding gun is fixed and a cap tip detaching apparatus is moved in a detaching direction, however, since the welding gun is supported to the robot arm, the welding gun may be moved in the direction of the cap tip detaching direction.

In this case, in these drawings, reference numeral 1 denotes a base of the apparatus, and reference numeral 7 denotes a guide plate for positioning a shank attached to an end portion of the base 1 via an angle 8. An insertion hole 7a of a shank S is formed in the guide plate 7, and the shank S of a welding gun is vertically inserted to the insertion hole 7a in accordance with an operation of the robot arm. Reference numeral 2 denotes a slide truck supported to a rail 4 on the base 1. The slide truck 2 is coupled to a drive portion 3 such as an air cylinder or the like by an L-shaped bracket 3a, and can move forward in a direction of the guide plate 7 and move backward in an opposite direction.

Figure 5:
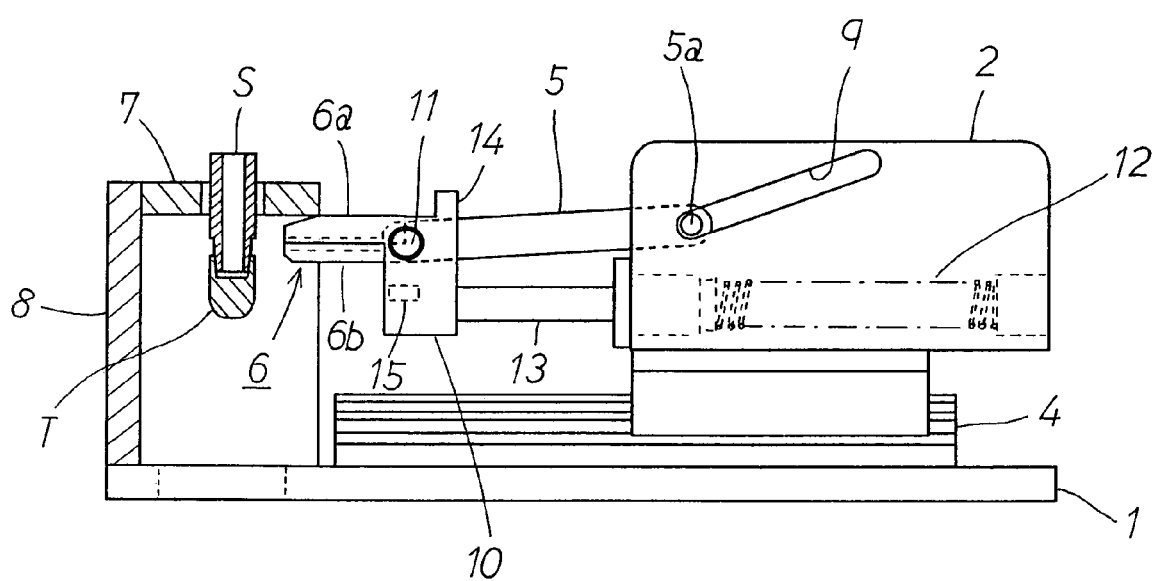
FIG. 5 is an explanatory view showing an operation of an apparatus in accordance with the first embodiment.

As shown in FIG. 5, a rod 13 is elastically supported to a front face of the slide truck 2 by an elastic member 12 such as a spring or the like so as to always protrude in the direction of the guide plate 7. A fixed pawl unit 10 is attached to a leading end of the rod 13, and a pawl portion 6 is supported on the fixed pawl unit 10. Accordingly, in the case that the slide truck 2 is moved forward in the direction of the guide plate 7 by the drive portion 3, the pawl portion 6 is moved forward to a portion between the shank S and the cap tip T.

The pawl portion 6 extends in a direction orthogonal to an axial direction of the shank S, and is constituted by a fixed pawl 6a brought into close contact with a lower end portion of the shank S at a time of moving forward, and a movable pawl 6b brought into close contact with an upper end portion of the cap tip T, as shown in FIG. 4. A U-shaped notch groove 6c for introducing the shank is formed in the fixed pawl 6a and the movable pawl 6b. The fixed pawl 6a is fixed to a leading end of the fixed pawl unit 10. However, a front portion of a lever 5 integrally provided with a rear side of the movable pawl 6b is pivoted to the fixed pawl unit 10 by a shaft 11. Accordingly, the movable pawl 6b can open and close like scissors around the shaft 11 with respect to the fixed pawl 6a.

In more detail, the structure is made such that a tapered tip fitting tube portion S2 is formed in a lower end portion of the shank S via a step portion S1, and the pawl 6 is inserted to a gap between an upper end edge portion T1 of the cap tip T fitted to the tip fitting tube portion S2 and the step portion S1. An upper surface of the fixed pawl 6a is brought into close contact with the step portion S1, and a lower surface of the movable pawl 6b is brought into close contact with the upper end edge portion T1.

Figure 7:
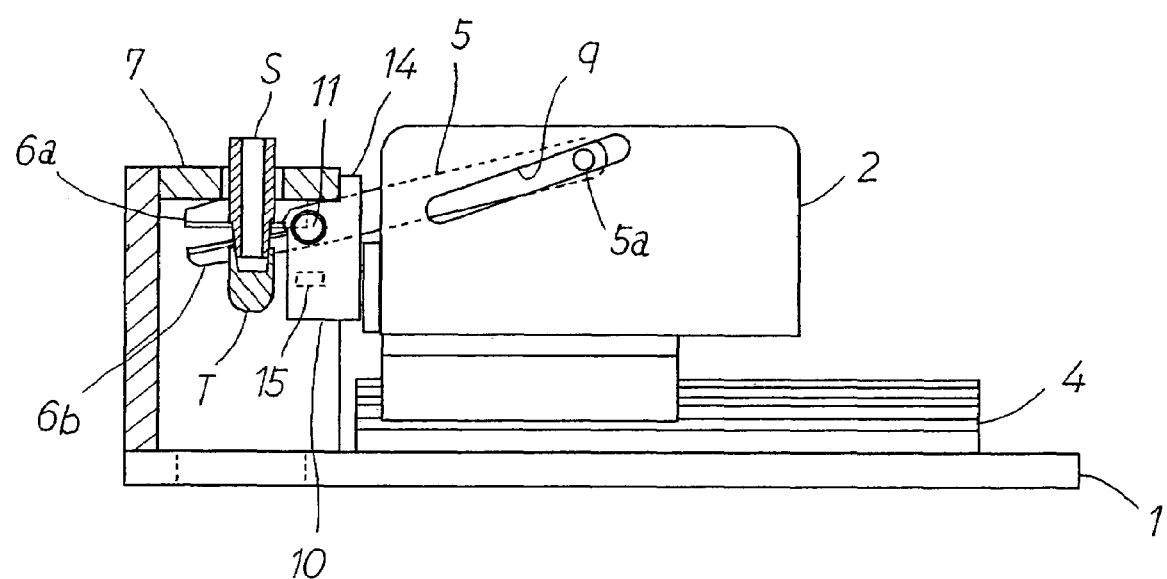
FIG. 7 is an explanatory view showing the operation of the apparatus in accordance with the first embodiment.

Cam grooves 9 coming down in a front side are provided in both side walls of the slide truck 2, and both ends of a cam follower 5a provided in a rear end portion of the lever 5 extending to a rear side of the movable pawl 6b are fitted to the cam grooves 9. As mentioned above, the rear end portion of the lever 5 is engaged with the cam groove 9, and the front portion is pivoted to the fixed pawl unit 10 by the shaft 11. Accordingly, if the slide truck 2 further moves forward by the drive portion 3 while compressing the elastic member 12 after moving forward the pawl portion 6 to the portion between the shank S and the cap tip T, and a distance between the fixed pawl unit 10 and the slide truck 2 comes close, the cam follower 5a is guided by the cam groove 9 as shown in FIG. 7, the lever 5 is rotated, and the movable pawl 6b in the leading end is adapted to be pushed down.

In this case, the fixed pawl unit 10 is provided with a stopper piece 14 brought into contact with the guide plate 7 so as to stop the further forward movement of the fixed pawl unit 10. It is possible to regulate the forward moving distance of the fixed pawl unit 10 by the stopper mechanism, and it is possible to always position accurately the pawl portion 6 with respect to the shank S inserted to the insertion hole 7a of the guide plate 7.

Further, as shown in FIG. 5, a sensor 15 is attached to the fixed pawl unit 10 or near the fixed pawl unit 10. The sensor 15 is provided for checking whether or not the shank S is normally inserted into the insertion hole 7a of the guide plate 7, and whether or not the cap tip T is completely detached. Accordingly, it is possible to securely and stably detach the cap tip. The sensor 15, for example, can be an optical type sensor constituted by a light projector and a light receiver.

Next, a description will be given of an operation of the apparatus with reference to FIGS. 5 to 7.

First, as shown in FIG. 5, the apparatus in accordance with the present invention is moved by the robot arm, and the shank S is inserted into the insertion hole 7a of the guide plate 7. Next, the drive portion 3 is actuated and the slide truck 2 moves forward toward the shank S along the rail 4. Together with the movement, the fixed pawl unit 10 provided in the leading end of the rod 13 moves forward, and the pawl portion 6 enters into the portion between the shank S and the cap tip T. At this time, the fixed pawl 6a and the movable pawl 6b are in an integrally overlapping state, the upper surface of the fixed pawl 6a is brought into close contact with the shank S, and the lower surface of the movable pawl 6b is brought into close contact with the cap tip T.

Figure 6:
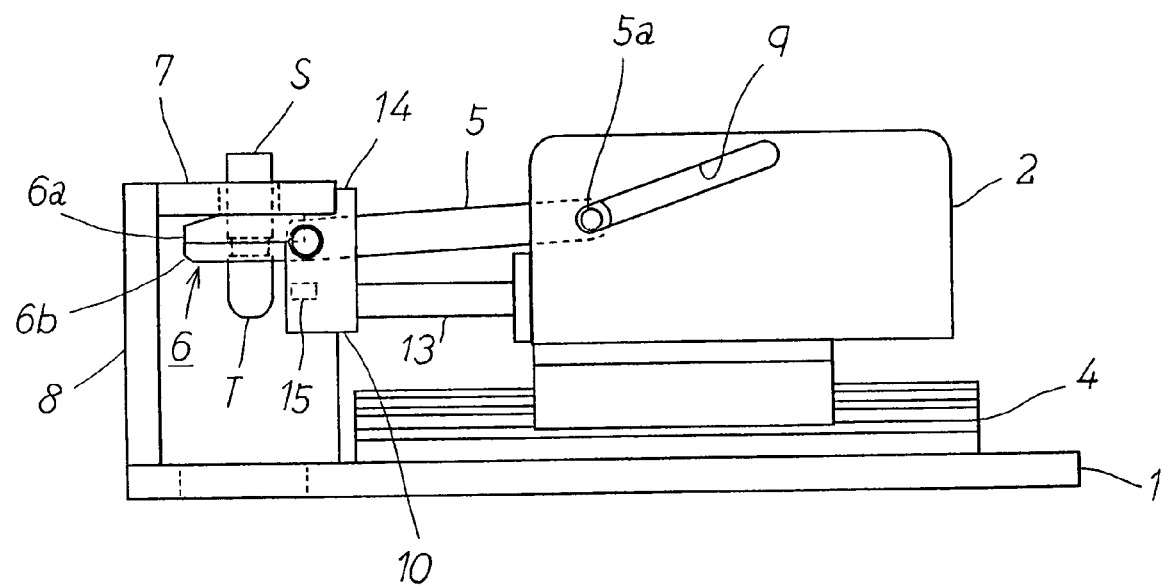
FIG. 6 is an explanatory view showing the operation of the apparatus in accordance with the first embodiment.

Next, as shown in FIG. 6, the stopper piece 14 is brought into contact with the guide plate 7 so as to stop the further forward movement of the fixed pawl unit 10. At this time, the shank S is always set to the right position by the insertion hole 7a of the guide plate 7 and the notch groove 6c of the pawl portion 6. Further, if the slide truck 2 is moved forward while compressing the elastic member 12, the cam follower 5a of the lever 5 is guided by the cam groove 9 so as to be gradually ascended, as shown in FIG. 7. The lever 5 is rotated around the pivot portion 11, and the movable pawl 6b in the leading end is pushed down in the direction moving apart from the fixed pawl 6a. As a result, the cap tip T is easily detached from the shank S.

As mentioned above, in accordance with the apparatus on the basis of the present invention, as is different from the conventional structure in which one lever is inserted to the portion between the cap tip T and the shank S so as to unclench, the present invention detaches by using two pawls constituted by the fixed pawl 6a brought into close contact with the lower end portion of the shank S, and the movable pawl 6b brought into close contact with the upper end portion of the cap tip T so as to rotate in accordance with the rotation of the lever 5, as shown in FIG. 4. Accordingly, it is possible to apply a force in an axial direction to the portion between the cap tip T and the shank S, and it is possible to securely detach the cap tip T from the shank S. Further, since the structure is made such that the shank S is set in a state of being held by the fixed pawl 6a, and the press-down force of the movable pawl 6b is applied only to the cap tip T, there is no risk that the shank S is damaged. After detaching the cap tip T in the manner mentioned above, the slide truck 2 is moved backward to a position shown in FIG. 5, and the same operation is repeated thereafter.

Further, since the sensor 15 for checking whether or not the shank S is normally inserted into the insertion hole 7a of the guide plate 7 and whether or not the cap tip T is completely detached is attached to the fixed pawl unit 10 or near the fixed pawl unit 10, it is possible to securely detach the cap tip, it is possible to detect a mistake on the basis of a defect signal from the sensor 15 in the case that the cap tip fails to be detached, and it is possible to take a corresponding measure.

Figure 8:
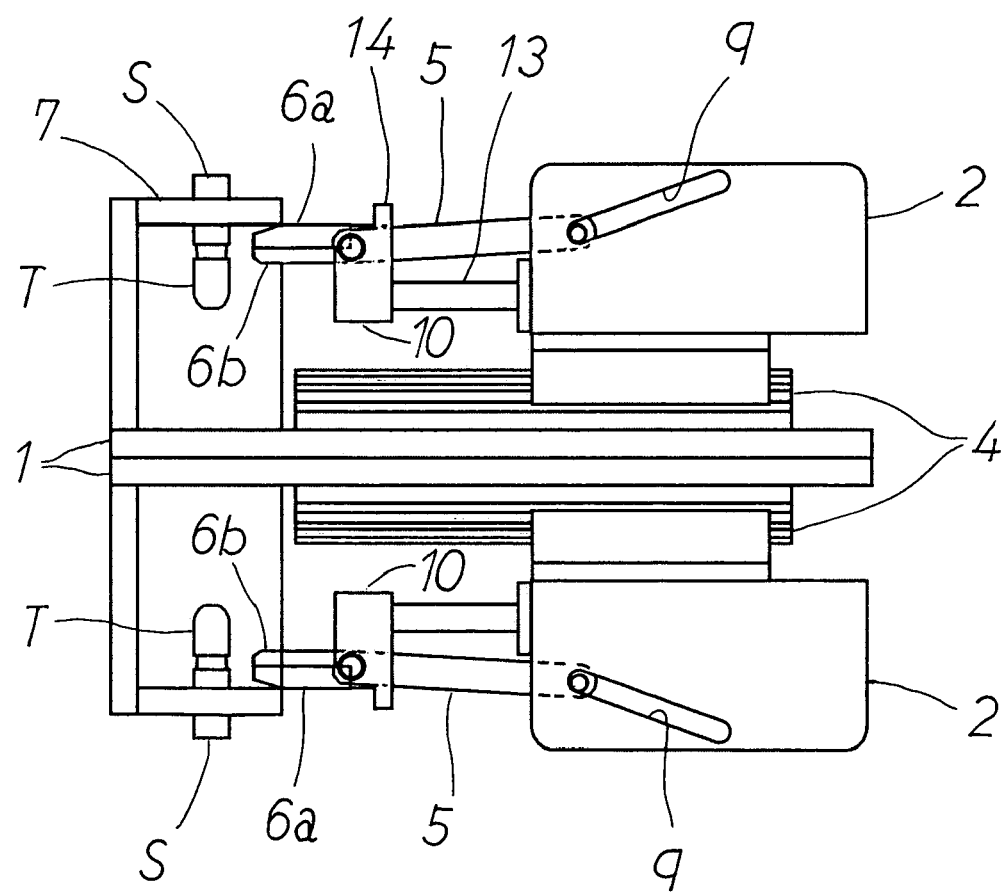
FIG. 8 is a front elevational view showing a modified embodiment of the first embodiment.

In this case, as shown in FIG. 8, it goes without saying that the apparatus in accordance with the present invention can be used in such a manner as to simultaneously detach two cap tips by being set vertically as a pair. The apparatus in accordance with the present invention can be applied to any one of a system of detaching the cap tip T in a state in which the shank S and the cap tip T are fixedly attached to the robot arm and come to the fixed position, and a system that the robot carries the present apparatus and detaches one by one.

Next, a description will be given of a second embodiment of the present invention.

Figure 9:
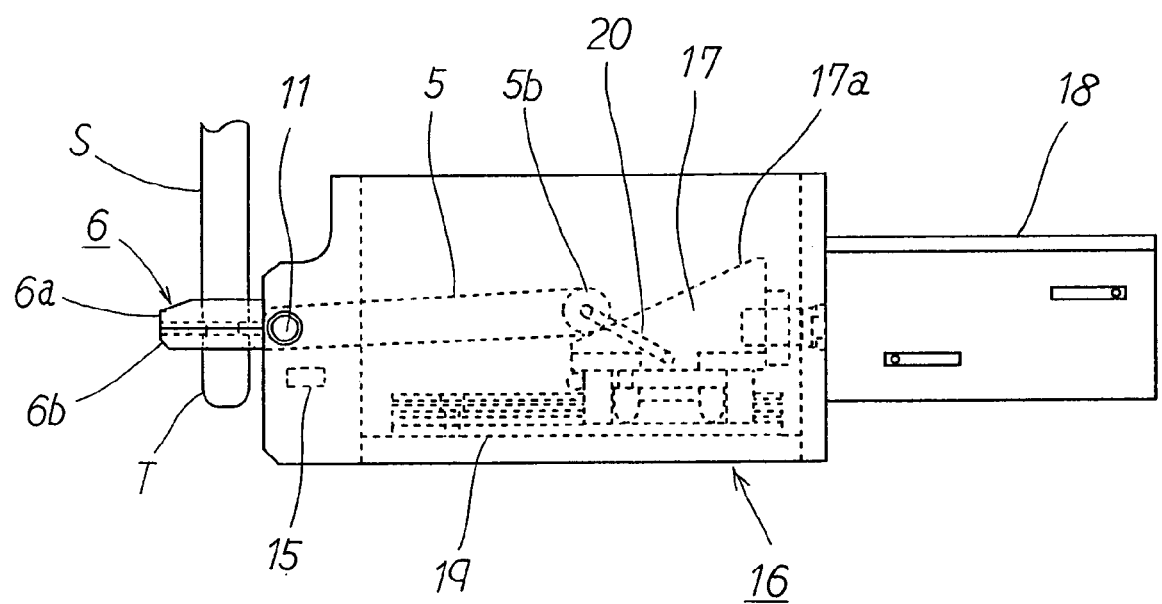
FIG. 9 is a front elevational view showing a second embodiment in accordance with the present invention.
Figure 10:
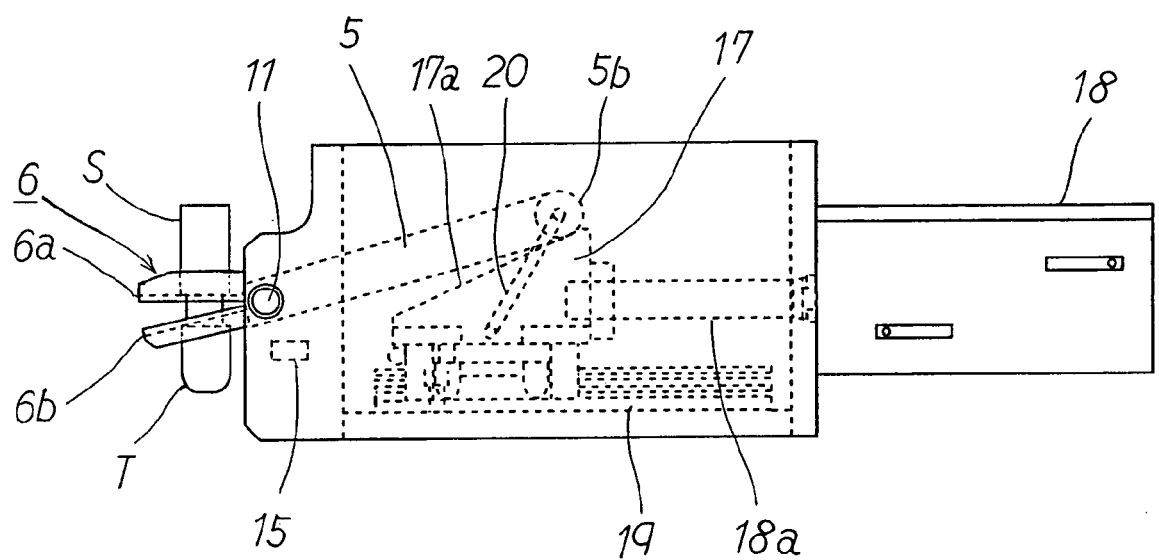
FIG. 10 is a front elevational view showing an operation of an apparatus in accordance with the second embodiment.
Figure 11:
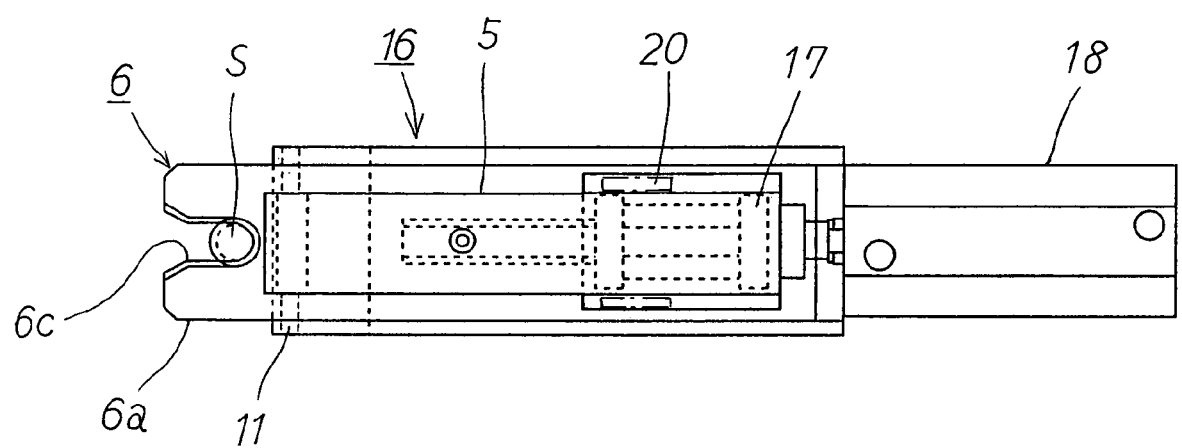
FIG. 11 is a plan view of FIG. 9.

FIG. 9 is a front elevational view showing an apparatus in accordance with a second embodiment, FIG. 10 is a front elevational view showing an operation state of the apparatus, and FIG. 11 is a plan view. In the following description, the same reference numerals as those of the first embodiment are used for substantially the same parts.

Since the apparatus in accordance with the second embodiment is planed to achieve a compact size and a weight saving, the apparatus can be used in accordance with various types such as the fixed type mentioned above, a swinging type to a stationary spot, a manually used hand type and the like. Further, it is possible to smoothly execute a detaching process without applying any impact force in a lateral direction, a rotational direction or the like to the shank S and the cap tip T.

In FIG. 9, reference numeral 16 denotes a box-like apparatus main body. A front face side of the apparatus main body 16 is provided with the pawl portion 6 constituted by the fixed pawl 6a and the movable pawl 6b. The fixed pawl 6a is horizontally fixed to the front face side of the apparatus main body 16, and the movable pawl 6b is pivoted to the front face side of the apparatus main body 16 by the shaft 11. Reference numeral 5 denotes a lever extending to a rear side of the movable pawl 6b.

The apparatus in accordance with the second embodiment does not have the drive portion 3 for moving the pawl portion 6 forward toward the shank S. It ascends the lever 5 by moving the robot arm, forward moving the shank S to the fixed position of the pawl portion 6 and thereafter moving forward a slide plate 17 mentioned below. At this time, the fixed pawl 2a is brought into close contact with the lower end portion of the shank S, and the movable pawl 2b is brought into close contact with the upper end portion of the cap tip T, in the same manner as that of the first embodiment.

An inner portion of the apparatus main body 16 is provided with the wedge type slide plate 17 for rotating the lever 5 in such a manner as to push the movable pawl 6b down after moving the shank S and the cap tip T forward to a fixed position within the notch groove 6c of the pawl portion 6. The slide plate 17 is structured such as to be movable forward and backward on a rail 19 by a drive portion 18 such as an air cylinder or the like installed in a rear side. A front surface side of the slide plate 17 is formed as a forward downward inclined surface 17a, and is structured such that the roller 5b in the rear end of the lever 5 moves on the inclined surface 17a.

As mentioned above, it is possible to achieve a compact size and a weight saving by arranging the pawl portion 6 and the drive portion 18 such as the air cylinder or the like linearly, and it is possible to achieve a reduced number of parts and an inexpensive structure.

In the case of the drive type such as the robot or the like, the force is vertically applied to the lower surface of the shank S and the upper surface of the cap tip T by rotating the lever 5 by the drive portion 18 so as to push down the movable pawl 6b, after forward moving the shank S and the cap tip T to the fixed position within the notch groove 6c of the pawl portion 6, and it is possible to easily detach the cap tip T while making a load to the welding machine main body small. Further, in the case of the stationary type resistance welding machine, the movable pawl 6b moves downward and detaches the cap tip T, by moving the slide plate 17 forward so as to rotate the lever 5, after moving the present apparatus to the fixed position of the shank S and the cap tip T.

In this embodiment, the rear portion of the lever 5 is energized by an elastic member 20 such as a spring or the like in such a manner as to maintain close contact with the inclined surface 17a, thereby bringing the fixed pawl 6a and the movable pawl 6b into close contact with each other and preventing the lever 5 from floating. In the illustrated embodiment, the rear portion of the lever 5 and the slide plate 17 are coupled by the elastic member 20, however, the structure may be made such that an elastic member such as a spring or the like always energizing is installed from a ceiling portion of the apparatus main body 16 toward the lever 5.

Further, it is possible to attach the sensor for checking whether or not the shank S is normally inserted into the pawl, and whether or not the cap tip T is detached, to the apparatus main body 16 or near the apparatus main body 16. Accordingly, it is possible to securely and stably detach the cap tip.

In this case, the structure of the pawl portion 6 is the same as that shown in FIG. 4, and the pawl portion 6 has the same structure as the first embodiment in a point that the pawl portion 6 is constituted by the fixed pawl 6a brought into close contact with the lower end portion of the shank S and the movable pawl 6b brought into close contact with the upper end portion of the cap tip T so as to rotate in accordance with the rotation of the lever 5, and applies the push-down force of the movable pawl 6b only to the cap tip T while setting the shank S to the state of being held by the fixed pawl 6a, and a point that the notch groove 6c for introducing the shank is formed in the pawl portion 6.

Next, a description will be given of an operation of detaching the cap tip T by the apparatus in accordance with the second embodiment with reference to FIGS. 9 and 10. First, the shank S is inserted into the notch groove 6c of the pawl portion 6 by moving the entire of the apparatus as shown in FIG. 9 or moving the welding gun. At this time, the fixed pawl 6a and the movable pawl 6b are in the overlapping state, the upper surface of the fixed pawl 6a is brought into close contact with the lower end portion of the shank S, and the lower surface of the movable pawl 6b is brought into close contact with the upper end portion of the cap tip T.

Next, as shown in FIG. 10, the drive portion 18 is actuated, and the slide plate 17 attached to the rod 18a is moved forward along the rail 19. The rear end portion of the lever 5 gradually ascends along the inclined surface 17a on the basis of the forward movement of the slide plate 17, the lever 5 is rotated around the shaft 11, and the movable pawl 6b provided in the leading end of the lever 5 is pushed down. As a result, the cap tip T is easily detached from the shank S.

As mentioned above, as is different from the conventional system of unclenching by one leverage type lever, in accordance with the apparatus of the present invention, the force approximately in the vertical direction (axial direction) can be applied to the portion between the shank S ad the cap tip T, and it is possible to securely detach the cap tip T using a small force. Further, since the upper surface of the fixed pawl 6a is in the state of being brought into close contact with the lower end portion of the shank S, there is no risk that the shank S is damaged. After detaching the cap tip T in the manner mentioned above, the slide plate 17 is returned to the initial position and the same operation is thereafter repeated.

Further, if the sensor 15 for checking whether or not the shank S is normally inserted into the pawl, and whether or not the cap tip T is detached is attached to the apparatus main body 16 or near the apparatus main body 16, it is possible to securely and stably detach the cap tip, and it is possible to securely correct a mistake on the basis of the defect signal from the sensor 9.

Figure 12:
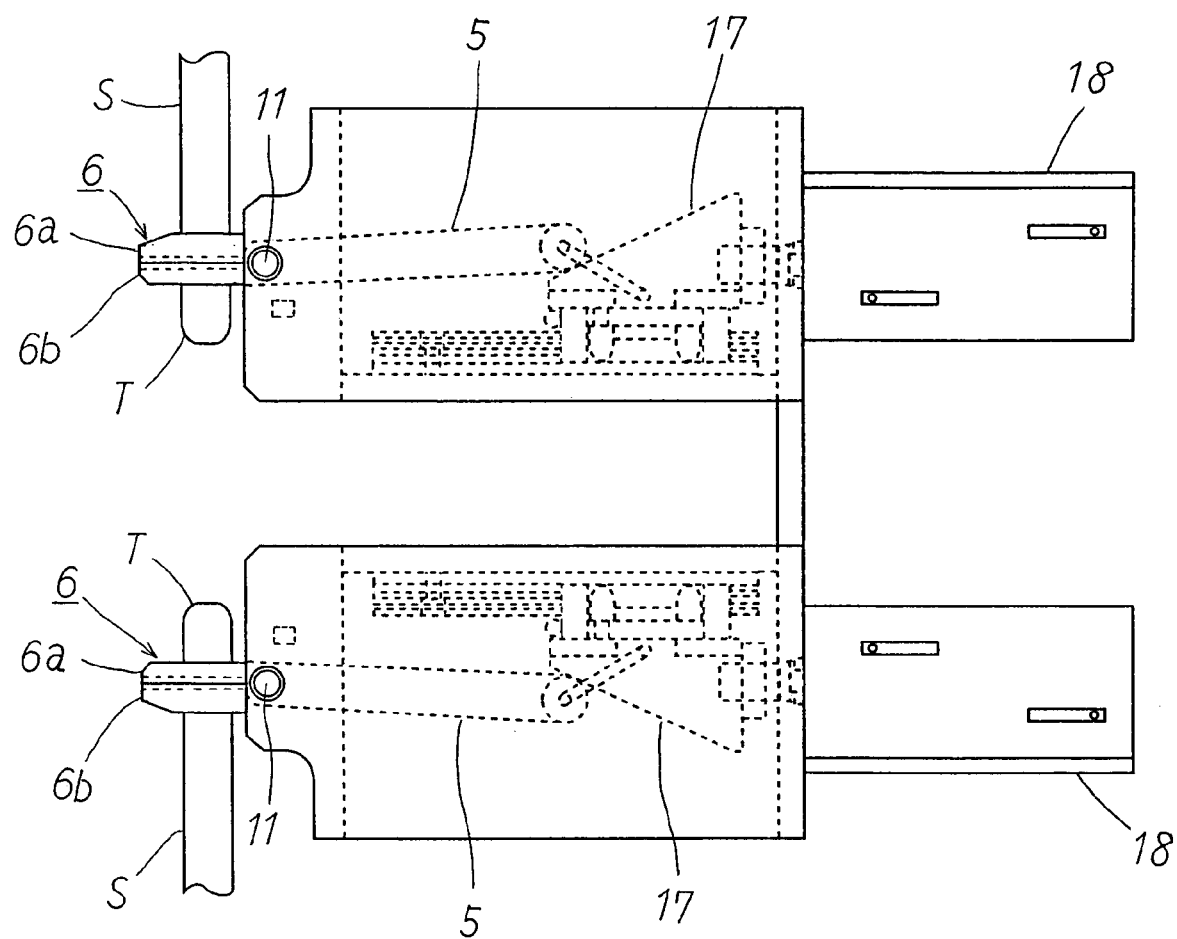
FIG. 12 is a front elevational view showing a modified embodiment of the second embodiment.

In this case, the description mentioned above is given of the case that one apparatus in accordance with the present invention is used, however, as shown in FIG. 12, it goes without saying that the apparatus can be used by setting a pair of upper and lower apparatuses so as to simultaneously detach two cap tips.

As is apparent from the description mentioned above, in accordance with the apparatus of the present invention, it is possible to simply, securely and stably detach the cap tip T fitted to the leading end of the shank S, the shank is not damaged, and it is possible to obtain an advantage of achieving an excellent durability and a reduced running cost.

DESCRIPTION OF REFERENCE NUMERALS 1 base
2 slide truck
3 drive portion
4 rail
5a cam follower
5b roller
6 pawl portion
6a fixed pawl
6b movable pawl
6c notch groove
7 guide plate
7a insertion hole
8 angle
9 cam groove
10 fixed pawl unit
11 shaft
12 elastic member
13 rod
14 stopper piece
15 sensor
16 apparatus main body
17 slide plate
17a inclined surface
18 drive portion
19 rail
20 elastic member
S shank
S1 step portion
S2 tip fitting tube portion
T cap tip
T1 upper end edge portion

What is claimed:

1. A cap tip detaching apparatus for a welding machine for detaching a cap tip fitted to a leading end portion of a shank of the welding machine, the apparatus comprising:
    a base;
    a guide plate mounted on the base defining an insertion location capable of receiving the shank with an axis of the shank coincident with an axial direction of the insertion location;
    a movable pawl coupled together with a fixed pawl such that the movable pawl is capable of being brought into close contact with an upper end portion of the cap tip;
    a rotating mechanism for rotating a lever extending to a rear side of the movable pawl, thereby pushing the movable pawl away from the fixed pawl, the rotating mechanism comprising a slide truck mounted to the base and freely movable in an orthogonal direction with respect to the axial direction of the insertion location; and
    a fixed pawl unit attached to a leading end of a rod elastically supported on the slide truck in such a manner as to always protrude to a front-side of the slide truck, the fixed pawl being provided in the fixed pawl unit and the fixed pawl being movable in relation to the base and in the orthogonal direction such that the fixed pawl is capable of being brought into close contact with a lower end portion of the shank;
    wherein the slide truck comprises a cam groove for actuating the rotating mechanism on the basis of further movement of the slide truck in the orthogonal direction after a movement of the fixed pawl to a location between the shank and the cap tip.

2. The cap tip detaching apparatus of claim 1, further comprising a lever that extends to a rear side of the movable pawl and that is pivoted to the fixed pawl unit.

3. The cap tip detaching apparatus of claim 2, wherein the fixed pawl unit comprises a stopper piece regulating a moving distance of the fixed pawl unit in the orthogonal direction.

4. A cap tip detaching apparatus for a welding machine for detaching a cap tip fitted to a leading end portion of a shank of the welding machine, the apparatus comprising:
    a base;
    a guide plate mounted on the base defining an insertion location capable of receiving the shank with an axis of the shank coincident with an axial direction of the insertion location;

a fixed pawl mounted on the base and being movable in relation to the base and in an orthogonal direction with respect to the axial direction of the insertion location such that the fixed pawl is capable of being brought into close contact with a lower end portion of the shank;

a movable pawl coupled together with the fixed pawl such that the movable pawl is capable of being brought into close contact with an upper end portion of the cap tip; and a rotating mechanism for rotating a lever extending to a rear side of the movable pawl, thereby pushing the movable pawl away from the fixed pawl, the rotating mechanism comprising a wedge type slide plate for actuating the rotating mechanism on the basis of movement of the slide plate in the orthogonal direction after a movement of the fixed pawl to a location between the shank and the cap tip.

* * * * *